Aug. 9, 1966 P. J. MIGHTON 3,265,379
OUT-OF ROUND ATTACHMENT FOR PIPE BEVELING MACHINES
Filed July 8, 1963 3 Sheets-Sheet 3

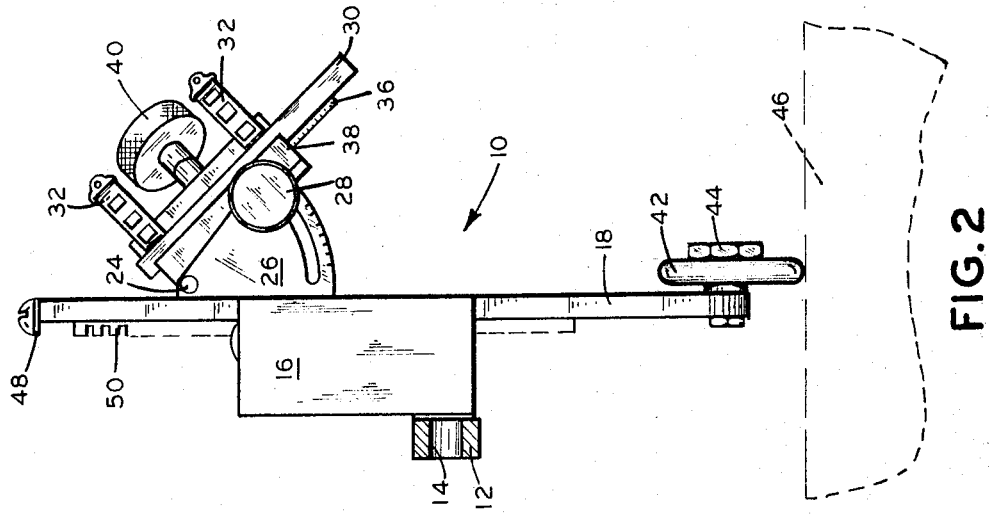
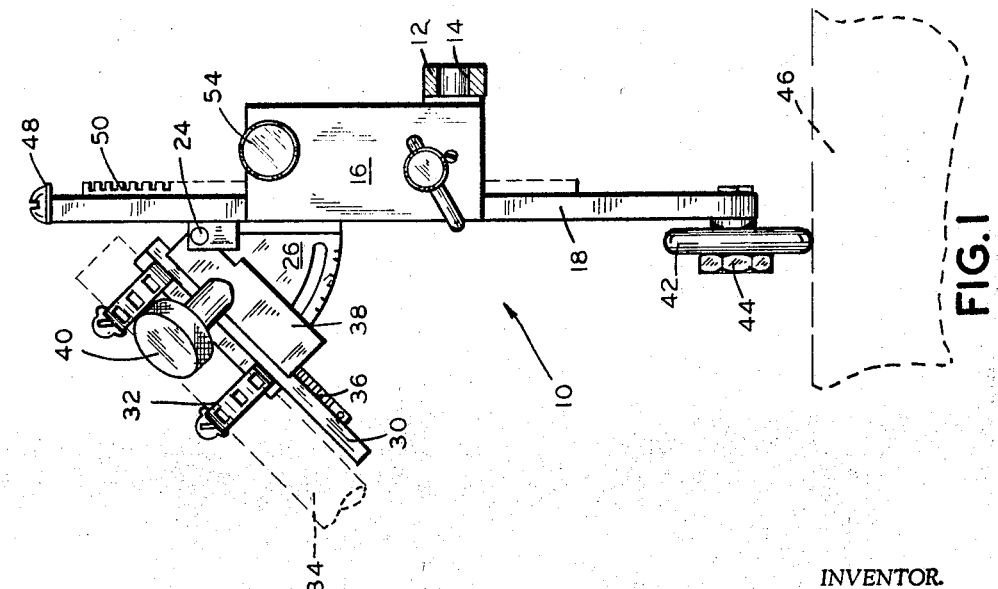
INVENTOR.
P. J. MIGHTON
BY  Head & Johnson
ATTORNEYS

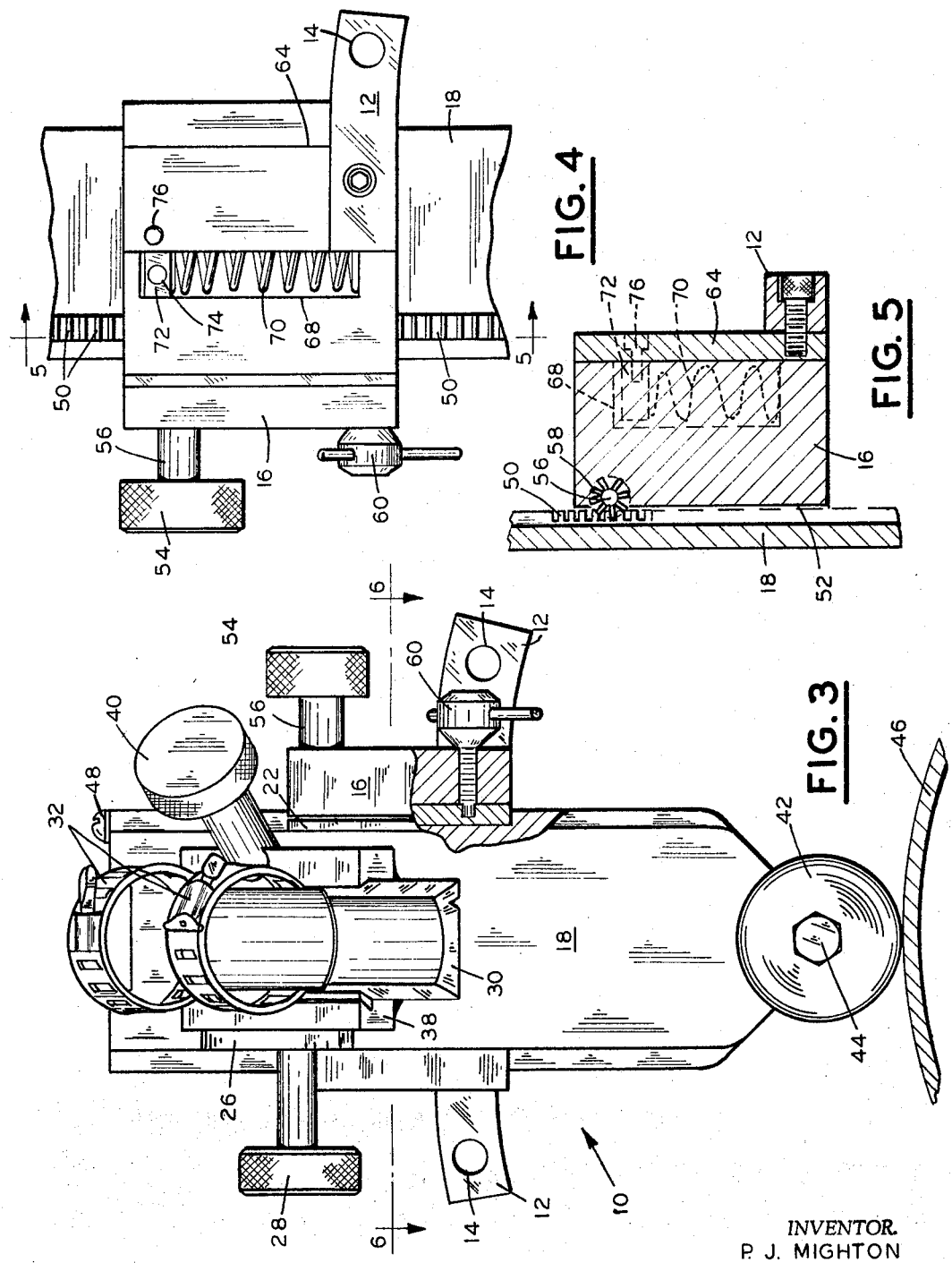

INVENTOR.
P. J. MIGHTON
BY
Head & Johnson
ATTORNEYS

United States Patent Office 3,265,379
Patented August 9, 1966

3,265,379
OUT-OF-ROUND ATTACHMENT FOR PIPE BEVELING MACHINES
Perceptimus J. Mighton, 1419 N. 78th E. Ave., Tulsa, Okla.
Filed July 8, 1963, Ser. No. 293,479
3 Claims. (Cl. 266—23)

This invention relates to pipe cutting and beveling apparatus. More particularly, but not by way of limitation, this invention relates to an attachment for ring gear type apparatus for cutting or beveling imperfect or out-of-round pipe and the like.

Typically, in cutting and beveling pipe a cutting torch is attached to a ring gear which is affixed to the pipe and adapted to rotate coaxially thereabout and hence move the cutting torch circumferentially around the pipe. However, if the pipe is imperfect, i.e. the outer periphery is distorted or out-of-round or contains other imperfections, the cutting torch is unable to efficiently cut the pipe in a smooth manner. Very often the cut will produce an uneven bevel.

Accordingly, it is a primary object of this invention to provide an attachment for cutting torches of the type secured to the ring gear of a pipe cutting machine of the type wherein the ring gear is adapted to be rotated circumferentially about the pipe and whereby a substantially straight and true beveled cut results.

It is another object of this invention to provide an out-of-round attachment used in circumferentially rotated ring gear type pipe beveling machines wherein a cutting torch is adapted to move according to the regularity or irregularity of the pipe closely adjacent thereto.

It is still another object of this invention to provide an out-of-round attachment for pipe beveling machines wherein the torch, a pipe follower roller, and the load bearing means are aligned in substantially the same plane.

It is still a further object of this invention to provide an out-of-round attachment for pipe beveling machines of the type heretofore described wherein the cutting torch can be rotated in either clockwise or counterclockwise direction without distortion or uneven cutting operations.

Another object of this invention is to provide an out-of-round attachment for pipe beveling machines wherein the required tension of the torch and pipe follower roller can be readily adjusted and maintained by the operator.

Another object of this invention is to provide an out-of-round attachment for pipe beveling machines wherein provision is made for making various adjustments of the torch.

These and other objects of this invention will become more apparent upon further reading of the detailed description and claims when taken in conjunction with the following illustrations of which:

FIGURE 1 is a right side elevational view of the apparatus of this invention.

FIGURE 2 is a left side elevational view of the apparatus of this invention.

FIGURE 3 is a front elevational view of the apparatus of this invention.

FIGURE 4 is a partial rear elevational view, partly cut away, of the device of this invention.

FIGURE 5 is a sectional view taken along the line 5—5 of FIGURE 4.

GENERAL DESCRIPTION

Figure 6:
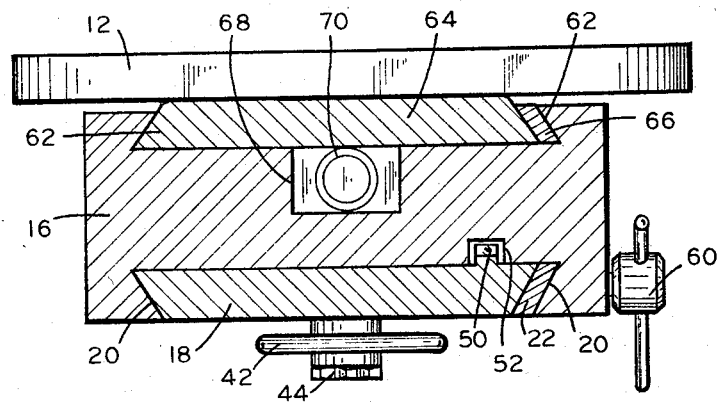
FIGURE 6 is a sectional view taken along the line 6—6 of FIGURE 3.

Broadly, this invention concerns an out-of-round attachment for pipe cutting machines of the type wherein the torch is adapted to be circumferentially rotated about the pipe for cutting, and preferably, beveling pipe ends for future welding and the like. The apparatus is so constructed that the axis of the torch, the axis of a pipe follower roller and the means to provide a resilient load to the roller are all aligned in the same plane. An adjustable torch bracket is adjustably and vertically retained within a main support guide. This torch bracket includes a lower pipe follower roller. A bracket is adapted to be attached to the pipe cutting machine, preferably the ring gear thereof, wherein the main support guide and its affixed torch bracket are adaptable to vertically move with respect thereto against spring tension when the torch bracket, and roller, is moved downwardly against the pipe which restrains further movement. Further movement of the forward torch bracket causes the main support guide to now move against the spring tension which after the locking of the two together maintains a predetermined resilient tension on the pipe follower roller.

DETAILED DESCRIPTION

Referring now to FIGURES 1, 2 and 3, the out-of-round attachment of this invention is generally designated by the numeral 10 which is adapted to be readily attached to a pipe beveling machine, not shown, by means of a rear bracket 12 having bolt or stud openings 14 there provided. A support guide member 16 is adapted to vertically receive a forward torch bracket 18 in dovetail or V-ways 20 (which also includes a wedge member 22). The torch holding means 38 is pivotally supported upon the forward bracket at point 24 with respect to an angular adjustment bracket and indicator 26 which can be retained at a given position by locking knob 28. The torch is supported by a plate member 30 which includes and operated clamping brackets 32 for grasping torch 34. The plate includes a rack 36 which permits axial movement of the torch with respect to torch holding means 38 upon movement of knob 40 at the end of which is a pinion, not shown, engaging with rack 36. The forward torch bracket 18 further includes at its lower end a pipe follower roller 42 which is supported by a bearing 44 which is threadably locked to forward torch bracket 18. The follower roller 42 is adapted to be engaged against pipe 46 and follow the outer periphery as the torch is moved accordingly. At the topmost end of forward torch bracket 18 is a stop 48 to limit downward movement of the bracket. Attached to the back side of torch bracket 18 is a vertical rack 50, in which a passageway 52 is provided in support guide 16. Rotatable knob 54 includes a shaft 56 passing through support guide 16 and terminating with a pinion 58 engageable with rack 50 for vertically moving bracket 18.

Means is provided to lock the forward torch bracket with respect to the support guide body 16 at any given position by rotating threaded lock member 60. This, in turn, forces wedge member 22 against forward support bracket 18, the operation of which is hereinafter more amply described.

Rearwardly of the support guide 16 are dovetail or V-grooves 62 within which the rear bracket 64 is operably positioned. A wedge member 66 acts as a shim for the bracket. It is to be noted that rear bracket 64, which includes the attachment bracket 12, is adapted for movement in a plane parallel to the movement of forward torch bracket 18. A recess 68 is formed in support guide 16, contiguous to the rear bracket, for a coil spring 70 and a retainer member 72, the latter of which includes threaded openings 74 for attachment with the rear bracket 64. Accordingly it should be readily noted that any movement of the support guide 16 in an upward direction relative to the rear bracket 64 which is normally fixed to the beveling machine increases the tension of spring 70.

OPERATION

The operation of the out-of-round attachment of this invention as described and claimed herein occurs after rear bracket 64 is attached to a circumferentially rotating ring gear member of a typical pipe beveling and cutting machine by bolted connection through openings 14 to the ring gear, not shown. After the beveling machine is affixed in place on the pipe, the locking member 60 is released which permits the forward torch bracket 18 to drop or be positioned by rotation of knob 54 and pinion 58 with respect to the rack 50 attached to the forward bracket 18. Movement of bracket 18 is continued downward until the pipe follower roller 42 engages pipe 46 which stops further downward movement thereof. However, because of the interrelationship of the pinion shaft 56 in guide support member 16, continued rotary movement, e.g. counterclockwise, now causes relative movement of support guide 16 upward relative to the now fixed forward torch bracket 18 and fixed rear bracket 64. This movement upward is against the tension of spring 70 which begins to compress and thereby increases said tension. At the desired tension the locking member 60 is then rotated to lock the desired position of the support guide 16, forward torch bracket 18 and rear brackets 64 and 12.

Thereafter, or before as desired, the torch 34 is positioned with the flame end downward towards the pipe and clamped by members 32, the angular position of which can be adjusted by releasing the locking knob 28 and/or the axial position of the torch adjusted by rotation of knob 40 and its associated pinion and rack, heretofore described.

After igniting the cutting torch the ring gear member is rotated, either mechanically or automatically, at the desired speed. As the pipe follower roller 42 drops into depressions within the pipe or raises with irregularities in the circumference of the pipe, the affixed torch likewise moves upwardly and downwardly. The adjusted spring tension is to be sufficient that the follower roller will stay in all depressions and impressions.

One important feature of this invention is the ability to rotate the device circumferentially about pipe 46 in any direction because the axis of the follower roller 42, torch 34 and the working axis of spring 70 are in the same aligned plane. In many prior devices one direction of rotation only was permissible, which caused the welding gas supply lead to twist. With the device of applicant's invention one pipe end can be cut or beveled by rotating the mechanism in one direction and then in the next cutting and beveling operation the apparatus can be rotated in the opposite direction and thereby prevent any kinks in the welding gas supply leads.

Although this invention has been described with reference to preferred and specific embodiments, it is to be understood that other modifications of this invention may be resorted to without departing from the spirit and scope of the appended claims. For example, instead of a gas cutting torch adjustably affixed to bracket 18, it is to be understood that mechanical or electrical pipe cutting and grinding mechanisms are also adaptable to the apparatus of this invention.

What is claimed:
1. An out-of-round attachment for a pipe cutting or beveling machine comprising,
   a support guide member;
   a first bracket retained by said guide member to move relative to said pipe, said first bracket including means to attach a pipe cutting or beveling device;
   a pipe follower roller at the lower end of said first bracket, the axis of said roller parallel to the axis of said pipe and in that plane defined by the axis of said cutting or beveling device and said pipe axis;
   a variable force means, the force axis of which is in said same plane, retained in said guide member;
   a second bracket attachable to said machine and retained with respect to said support guide, retainer means positioned above said variable force means and fixedly attached to said second bracket to prevent downward movement of said support guide yet permit relative upward movement of said support guide with respect to said second bracket to increase said force means;
   means to move said support guide relative to said first and second brackets; and
   means to lock said support guide and said first bracket in a given relative position.
2. An out-of-round attachment and torch holder for a pipe cutting machine comprising,
   a support guide;
   a forward torch bracket vertically retained and movable with respect to said support guide;
   means on said torch bracket to angularly and axially adjust and retain a welding torch with respect to said pipe forward of said bracket;
   means cooperating between said support guide and said torch bracket to vertically move said torch bracket;
   means cooperating between said support guide and said torch bracket to lock said bracket in a given position;
   a pipe follower roller at the lower end of said torch bracket, the axis of said roller parallel to the axis of said pipe and in that plane perpendicular to said forward torch bracket through the axis of said torch;
   a coil spring retained within said support, the axis of which is parallel to said forward torch bracket and in said same plane;
   a rear brascket attachable to said machine and retained with respect to said support guide, retainer means positioned above said coil spring and fixedly attached to said rear bracket to prevent downwardly movement of said support guide yet permit upward movement of said support guide relative to said rear bracket against the force of said spring whereby said spring force is transmitted to said forward torch bracket and follower roller against said pipe.
3. An out-of-round attachment and torch holder for a pipe cutting and beveling machine comprising,
   a support guide;
      parallel, vertical forward and rearward V-ways in said guide to receive a forward torch bracket and a rear bracket respectively;
   a recess opening toward said rearward V-way;
   a coil spring vertically situated in said recess;
   a retainer attached to said rear bracket and extending into said recess between the top of said spring and the top of said recess to prevent the downward movement of said guide relative to said rear bracket yet permit upward movement against the force of said spring;
   means to attach said rear bracket to said pipe cutting and beveling machine;
   said forward bracket including means to angularly and axially adjust a welding torch and a pipe follower roller at the lower end thereof, the axis of said roller parallel to the axis of said pipe and in the same aligned plane with the axis of said torch and the axis of said spring;
   rack gear means on said forward bracket;
   pinion gear means associated with a hand knob rotatatably supported by said guide to engage with said rack; and
   means to lock said forward bracket and guide at the desired relative position.

References Cited by the Examiner
UNITED STATES PATENTS
1,852,413   4/1932   Hickey _____ 266—23

JOHN F. CAMPBELL, Primary Examiner.
M. L. FAIGUS, Examiner.